United States Patent
Obst

(10) Patent No.: US 7,654,488 B2
(45) Date of Patent: Feb. 2, 2010

(54) AIRCRAFT DOOR ARRANGEMENT WITH AN AIRCRAFT DOOR THAT SWINGS BY 180 DEGREES

(75) Inventor: Steffen Obst, Harburg (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 496 days.

(21) Appl. No.: 11/571,684

(22) PCT Filed: Jul. 5, 2005

(86) PCT No.: PCT/EP2005/007205

§ 371 (c)(1),
(2), (4) Date: Jan. 5, 2007

(87) PCT Pub. No.: WO2006/010437

PCT Pub. Date: Feb. 2, 2006

(65) Prior Publication Data

US 2008/0035793 A1    Feb. 14, 2008

(30) Foreign Application Priority Data

Jul. 26, 2004   (DE) .................. 10 2004 036 184

(51) Int. Cl.
    *B64C 1/14*  (2006.01)
(52) U.S. Cl. ...................... 244/129.4; 49/246
(58) Field of Classification Search ............. 244/129.4, 244/129.5; 49/246, 247, 248, 249, 253; 16/302, 16/311, 286
See application file for complete search history.

(56) References Cited

U.S. PATENT DOCUMENTS

| | | | | |
|---|---|---|---|---|
| 2,116,330 A | * | 5/1938 | Tjaarda | ................. 296/202 |
| 2,542,605 A | * | 2/1951 | Werner | ............ 296/146.12 |
| 2,997,751 A | | 8/1961 | McPherren | |
| 3,085,297 A | | 4/1963 | Linderfelt | |
| 3,213,962 A | | 10/1965 | Clark | |
| 4,199,120 A | | 4/1980 | Bergman et al. | |
| 4,479,622 A | | 10/1984 | Howse et al. | |
| 4,510,714 A | | 4/1985 | Kasper et al. | |
| 5,035,026 A | * | 7/1991 | Carlo et al. | ................. 16/288 |
| 5,833,300 A | * | 11/1998 | Russke | ................. 296/108 |

FOREIGN PATENT DOCUMENTS

| | | |
|---|---|---|
| DE | 33 05 451 | 9/1983 |
| EP | 0105082 | 4/1984 |

* cited by examiner

*Primary Examiner*—Michael R Mansen
*Assistant Examiner*—Michael Kreiner
(74) *Attorney, Agent, or Firm*—Darby & Darby

(57) ABSTRACT

A door arrangement for an aircraft that has a fuselage with a fuselage structure includes a door to be arranged inside a door frame of the fuselage structure and a door joint mechanism attached to the door of the door frame and to the fuselage structure. The door joint mechanism has a seven-joint linkage provided with first to seventh joints by means of which the door, guided exclusively in a rotationally articulated manner, is moveable over a predefined pivoting angle range from a closed position inside the door frame to an open position outside of the door frame and fuselage, and back again. In addition, an aircraft, especially a fixed-wing aircraft, encompassing at least one aircraft door arrangement is provided.

15 Claims, 4 Drawing Sheets

AIRCRAFT DOOR ARRANGEMENT WITH AN AIRCRAFT DOOR THAT SWINGS BY 180 DEGREES

FIELD OF THE INVENTION

The present invention relates to a door arrangement for an aircraft that has a fuselage with a fuselage structure that includes a door frame surrounding a door opening, said door arrangement having a door that is to be arranged inside the door frame as well as having a door joint mechanism that is attached to the door and to the fuselage structure. Moreover, the invention relates to an aircraft with such a door arrangement.

BACKGROUND

Door arrangements are known for aircraft having a fuselage with a fuselage structure that includes a door frame surrounding the door opening. The door arrangement has a door that is to be arranged inside the door frame and a door joint mechanism that is attached to the door and to the fuselage structure. For aerodynamic reasons, the outer contour of the door has to lie flush with the outer contour of the fuselage structure adjacent to the door frame. This aspect as well as the considerable thickness of the door due to the usual lightweight mode of construction make it necessary for substantial portions of the door to be situated inside the door frame when the door is in the closed position whereas, in order to reach an open position, the door has to be moved out of the door frame and partially or completely around an edge of the door frame into a position that is essentially outside of the fuselage. This calls for very complex kinematics of the door joint mechanism since the door has to be prevented from colliding with parts of the fuselage structure along the path of motion of the door.

If the fuselage of the aircraft has a pressurized cabin, which is the case for almost all large passenger aircraft nowadays, the door also has to be sealed off relative to the door frame during flight in order to prevent a loss of pressure from the pressurized cabin. This calls for sealing elements between the door and the surrounding fuselage structure or the surrounding door frame. In order to prevent the door from opening accidentally, especially during flight, it is also necessary to lock the door in the closed position. For this purpose, designs are normally employed that call for the door to be raised out of the locked closed position into an unlocked closed position or for the door to be lowered from the unlocked closed position into the locked closed position.

Especially those aircraft doors that are designed as pivoting emergency-exit doors or as emergency-exit hatches usually have to be guided over a very large pivoting angle range of 0° to 90° or more, but often of 0° to 180° or more, in order to be opened and closed. This large pivoting angle range, in conjunction with the above-mentioned necessary properties of the door and of the adjacent fuselage structure, require a quite complex door joint mechanism and this is another reason for the complexity of the kinematics of the door. Therefore, taking into consideration the above-mentioned requirements, conventional door arrangements for aircraft make use of a door joint mechanism having translational articulated elements that ensure the cited large pivoting angle range of the door under the above-mentioned conditions.

With such conventional door arrangements, however, it has been found that the translational articulated elements exhibit quite a lot of play and that they cannot always guide the door precisely over the large pivoting range. Moreover, due to the translational articulated elements, the position of all of the articulated elements involved when the door is being opened or closed is not unambiguously defined. Furthermore, when a door joint mechanism with translational articulated elements is used, the position of the door relative to the door frame cannot be defined precisely enough which, in turn, means that the sealing of the door against internal pressure of the cabin can only be realized with a great deal of effort and the sealing conditions are unfavorable. Moreover, when the door is in the open position, the transmission and application of the loads emanating from the opened door towards and into the fuselage structure are unfavorable.

SUMMARY OF THE INVENTION

The invention is based on an object or technical problem of avoiding one or more drawbacks associated with the generic state of the art, and of creating a door arrangement for an aircraft having a door joint mechanism with which the door can be reliably opened and closed over a large pivoting angle range and can be sealed against a fuselage structure of the aircraft; here, in at least one embodiment, it should be possible to configure the door of the door arrangements as an emergency-exit door. Furthermore, an aircraft having such a door arrangement is to be put forward.

The present invention provides a door arrangement for an aircraft that has a fuselage with a fuselage structure that includes a door frame surrounding a door opening comprises a door that is to be arranged inside the door frame as well as a door joint mechanism that is attached to the door and to the fuselage structure. This door joint mechanism has a seven-joint linkage provided with first to seventh pivots by means of which the door—guided exclusively in a rotationally articulated manner—can be moved or pivoted over a predefined pivoting angle range, preferably of 0° to 90° or more, especially 0° to 180° or even more, from a closed position inside the door frame to an open position outside of the door frame and fuselage, and back again.

The above-mentioned basic form of the door arrangement according to the invention applies to a design in which the door does not have to be raised in order to be unlocked or lowered in order to be locked. A door arrangement according to the invention in which the door additionally has the above-mentioned locking and unlocking properties comprises other preferred additional components according to the invention which will be elaborated upon in greater detail below.

The door is advantageously arranged in a lateral area of the fuselage. Depending on the fuselage structure, however, it can also be positioned at any other suitable places in the fuselage. Moreover, the door is preferably configured as an emergency-exit door or emergency-exit hatch. Fundamentally, however, the invention is not limited to such a type of door. In suitable application cases, the door can also be configured, for instance, as a passenger door, a cargo door or a hatchback or the like. A door that can be opened and closed manually as well as automatically or else by means of control elements or actuators can be realized within the scope of the door arrangement according to the invention. If the door is designed as an emergency-exit door or emergency-exit hatch and is not intended to be actuated exclusively manually, then, in at least one embodiment, it preferably has an autonomous emergency-opening drive that can either be configured as a separate drive or else integrated into a regular door drive (no emergency).

Within the scope of the present invention, the zero-degree position of the door is to be construed as the position in which the door is closed or else closed and locked. The predefined pivoting angle range preferably encompasses a range of 0° to 90° or more, especially 0° to approximately 180° or more (for instance, up to 200°, 210° or 220°), but also ranges such as, for example, 0° to 95°, 0° to 100°, 0° to 110°, 0° to 120°, 0° to 130°, 0° to 140°, 0° to 150°, 0° to 160°, 0° to 170°, as well as the ranges in-between.

The door joint mechanism of the door arrangement according to the invention is advantageously attached, on the door side, to an edge area of the door and, on the fuselage side, to the door frame and/or to an area of the fuselage structure that is close to the frame. Since the seven joints of the seven-joint linkage are designed exclusively as rotational joints, the linkage consequently does not have any translational linkage elements or linkage elements that are mounted in a translational manner. If the manufacturing tolerances are sufficiently precise, each rotational joint can have just one single axis of rotation. In order to more easily compensate for installation tolerances, particularly those that occur on the door and frame, however, the rotational joints can also be configured as spherical articulated elements, for example, in the form of so-called spherical plain bearings. The seven-joint linkage guides the door over the entire pivoting angle range along a precisely defined path of motion.

In this context, the seven-joint linkage can be constructed according to the invention in such a way that it not only guides the door but also supports it or its weight, either completely or at least partially. If the seven-joint linkage is configured in such a way that it only guides the door but does not support it or else does so only partially, a separate support device can be provided for the door, said device then completely or partially taking over said supporting function. Such a support device can be integrated, for example, into an actuation device of the door, for instance, an actuating drive such as, for example, an actuating cylinder or the like.

The door arrangements according to the invention with their seven-joint linkage make it possible to always guide the door accurately over a very large pivoting angle range along a precisely defined path of motion when the door is opened or closed. This high level of precision is ensured particularly since the seven-joint linkage does not have any translational linkage elements or linkage elements that are mounted in a translational manner and the seven joints are designed exclusively as rotational joints with which a very precise fit and very little bearing clearance can easily be achieved. The precisely defined path of motion of the door is determined by the kinematics of the seven-joint linkage. The seven-joint linkage also ensures that the position of all of the involved linkage elements is always unambiguously defined while the door is being moved.

Moreover, it has been found that the seven-joint linkage, in spite of its joints being configured exclusively as rotational joints, is capable of effectuating an opening and closing procedure in which the door—starting from the closed position in which considerable portions of the door are situated inside the door frame—can be moved out of the door frame and partially or completely around an edge of the door frame into an open position that is essentially outside of the fuselage, without colliding with the fuselage structure in this process. Increased reliability and precision can also be achieved in this context.

Moreover, with the seven-joint linkage of the door arrangement according to the invention, the position of the door relative to the door frame can be determined unambiguously and with a very precise fit when the door is in the closed position. As a result, the door can be sealed more easily and more precisely against the internal cabin pressure of the fuselage and more favorable sealing conditions can be attained.

Finally, when the door is in the open position, the door arrangement according to the invention with its seven-joint linkage allows a very favorable transmission and application of the loads emanating from the opened door towards and into the fuselage structure.

Additional preferred and advantageous embodiment features of the door arrangement according to the invention are the subject matter of subordinate claims 2 to 11.

The above-mentioned object is achieved according to a second aspect by means of an aircraft according to the invention having the features of claim 12.

The present invention also includes an aircraft having at least one aircraft door arrangement. The aircraft is especially configured as a fixed-wing aircraft and preferably has a pressurized cabin.

Fundamentally, however, it can also be configured as a rotary-wing aircraft or a convertiplane, for example, in the form of a tiltrotor helicopter. With the aircraft according to the invention, essentially the same advantages can be achieved as explained above in conjunction with the door arrangement according to the invention.

A preferred embodiment of the invention with additional configuration details and further advantages will be described in greater detail and explained below, making reference to the accompanying drawings.

BRIEF DESCRIPTION OF THE DRAWINGS

The following is shown.

DESCRIPTION OF A PREFERRED EMBODIMENT

Figure 1:
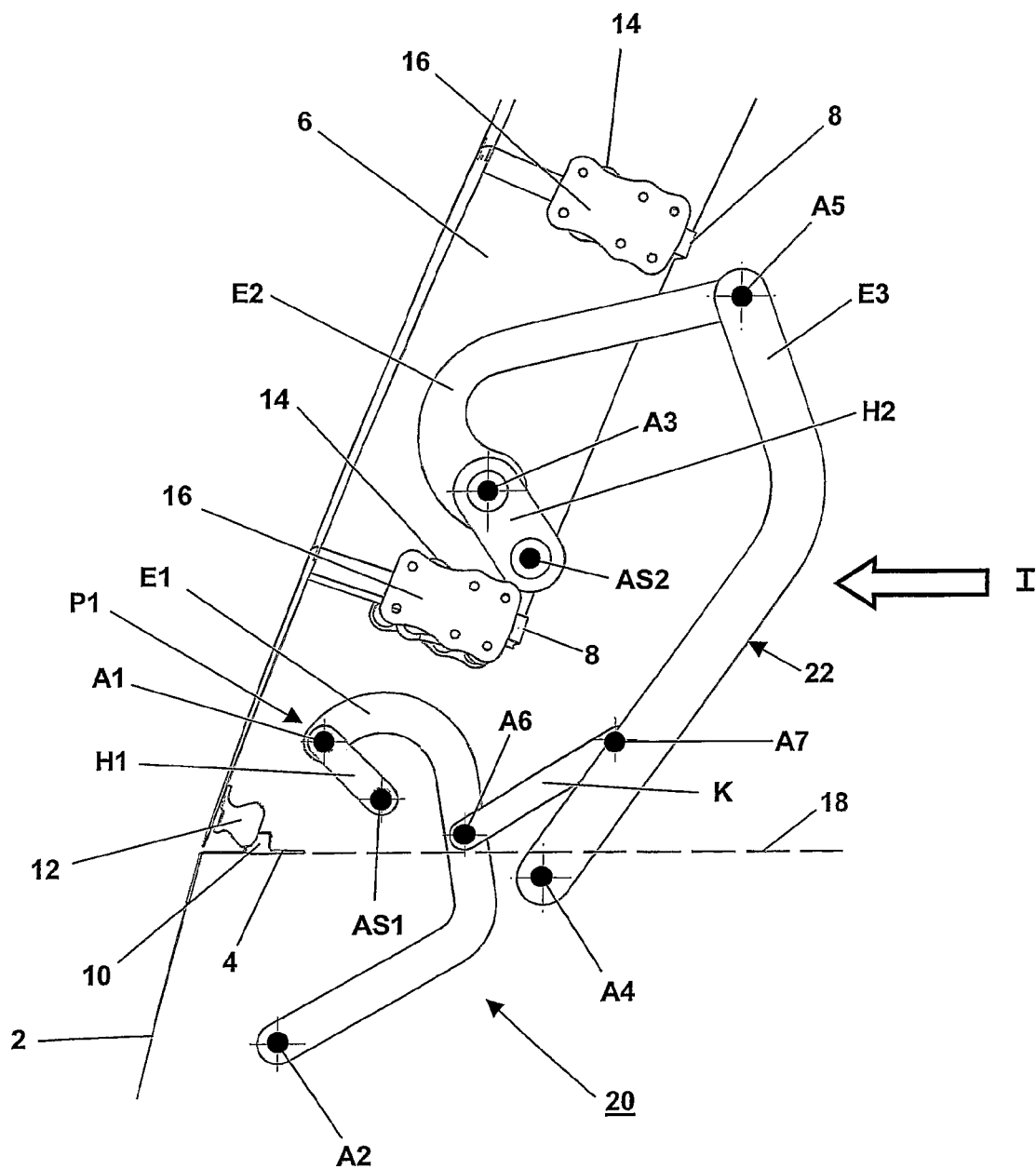
FIG. 1—a schematic cross-sectional view of a lateral area of an aircraft fuselage having a door arrangement according to the invention, in a first state.

FIG. 1 shows a schematic cross-sectional view of a lateral area of an aircraft fuselage 2 belonging to a passenger aircraft according to the invention and provided with a pressurized cabin, said aircraft being equipped with a door arrangement according to the invention. The fuselage 2 has a fuselage structure that includes a door frame 4 surrounding a door opening located in the fuselage 2. A door 6, which is configured in this embodiment as an emergency-exit door and which can be opened and closed, has a door structure 8 and is arranged inside the door frame 4. This door 6 is the type of door that, starting from an open position, can be moved into a closed position and locked in the closed position by means of a door locking mechanism and said door has to be lowered to be locked and then raised again in order to be unlocked. In order to raise and lower the door 6, the door arrangement is provided with a lifting device that will be described in greater detail below and by means of which the door 6 can be raised from a locked closed position into an unlocked closed position. From this position, in turn, the door 6 can then be moved into the open position. Moreover, by means of the lifting device, the door 6 can conversely be lowered from the unlocked closed position into the locked closed position.

Sealing elements in the form of an encircling, continuous sealing flange 10 on the frame side and of a door gasket 12 on the door side are provided between the door 6 and the door frame 4.

The door locking mechanism has several fittings 14 on the door side and several fittings 16 on the door frame side (referred to below as "frame side") which cooperate in the closed and locked state of the door 6. FIG. 1 shows the door 6 in a first state (in-flight state) in which it is closed, lowered and thus locked. As can also be seen in the drawing, the lower edge of the door 6 is in approximately the same plane as the cabin floor 18 (indicated in FIG. 1 by a broken line) of the fuselage 2.

The door arrangement also comprises a door joint mechanism that is attached to the door 4 and to the fuselage structure. To put it more precisely, the door joint mechanism is attached, on the door side, to a lower and lateral edge area of the door 6 and, on the fuselage side, to a lower area of the door frame 4 or of the adjacent fuselage structure next to the frame. The door joint mechanism has a seven-joint linkage 20 provided with first to seventh pivots A1 to A7. The pivots A1 to A7, which are formed exclusively by rotational joints, run parallel to each other and approximately in the lengthwise direction of the fuselage 2. One of the pivots of the seven-joint linkage 20, namely, the joint A1, defines an unambiguous door pivot A1 that is rotatory and that can be positioned stationary relative to the door 6. In this example, this door pivot A1, which will be elaborated upon in greater detail below, is in the area of the lower edge of the door 6 in the vicinity of the cabin floor 18.

The seven-joint linkage 20 supports and guides the door 6 during the unlocking, locking, opening and closing procedures. In this context, the door 6—guided exclusively in a rotationally articulated manner by the seven-joint linkage 20—can be pivoted over a pivoting angle range of 0° to approximately 180°. As a result, the door 6, starting from the closed position inside the door frame 4, can be moved laterally and downwards into the open position outside of the door frame 4 and fuselage 2, and back again.

As can also be seen in FIG. 1, the seven-joint linkage 20 has three articulated lever-like linkage members E1 to E3 arranged offset to each other and at a certain distance, as well as an articulated, lever-like coupling element K. This coupling element K joins the two linkage members E1 and E3 to each other in an articulated manner. The coupling element K prevents the linkage members E1 and E3 from being able to move freely with respect to each other, as a result of which the sequence of motion of the linkage mechanics would be undefined, and imparts the seven-joint linkage 20 with one degree of freedom. As a consequence, each element of the seven-joint linkage 20 acquires an unambiguous position during a sequence of motion.

Viewing the seven-joint linkage 20 in the direction of its joints A1 to A7 that are parallel to each other, the result is the configuration as depicted in FIG. 1. At its upper end, the first linkage member E1 with the first joint A1, which can be positioned so as to be stationary relative to the swinging door 6 and which forms the door pivot A1, is mounted on the door 6 in an articulated manner. At its lower end, the first linkage member E1 with the second joint A2, which is stationary relative to the door frame 4 and is below the cabin floor 18, is mounted on the door frame 4 in an articulated manner. At its lower end, the second linkage member E2 with the third joint A3, which can be positioned so as to be stationary relative to the door 6, is mounted on the door 6 in an articulated manner. At its lower end, the third linkage member E3 with the fourth joint A4, which is stationary relative to the door frame 4, is mounted on the door frame 4 in an articulated manner.

An upper free end of the second linkage member E2 is connected in an articulated manner to an upper free end of the third linkage member E3 via the fifth joint A5, which is non-stationary relative to the door 6 and to the door frame 4. As a result, said upper ends of the second linkage member E2 and of the third linkage member E3 have the fifth joint A5 as a shared joint A5. And the second linkage member E2 can be pivoted around the third joint A3 and the third linkage member E3 around the fourth joint A4, which is slightly below the cabin floor 18. At its lower end, the coupling element K with the sixth joint A6 is attached in an articulated manner to an intermediate section of the first linkage member E1. At its upper end, the coupling element K with the seventh joint A7 is attached to an intermediate section of the third linkage member E3. Accordingly, the coupling element K is not at all connected to the door 6 or to the door frame 4, but rather, only to the first and third linkage members E1 and E3.

As can be seen from the schematic cross-sectional view in FIG. 1, the first linkage member E1 has an upper end configured in the shape of a hook as well as a curved segment below the joint A6. The lower end of the second linkage member E2 is curved in the form of a hook. The third linkage member E3 is curved above the joint A7.

In the present embodiment, the lifting device of the door is configured as a part of the seven-joint linkage 20. To this end, the seven-joint linkage 20 has two pivoting lever-like door-lifting members H1, H2 which are designed so as to be fairly short relative to the linkage members E1 to E3. As can be seen in FIG. 1, one end of the first door-lifting member H1 is attached in an articulated manner to the upper end of the first linkage member E1 via the first joint A1. As a result, the first linkage member E1 is mounted in an articulated manner on the door 6 by means of the first door-lifting member H1. With the other end, the first door-lifting member H1 is attached to the door 6 via a first pivot AS1 that is stationary relative to the door 6. One end of the second door-lifting member H2 is attached in an articulated manner to the lower end of the second linkage member E2 via the third joint A3. As a result, the second linkage member E2 is mounted in an articulated manner on the door 6 by means of the second door-lifting member H2. With the other end, the second door-lifting member H2 is attached to the door 6 via a second pivot AS2 that is stationary relative to the door 6.

In addition, a blocking device (not shown) is provided on both of the door-lifting members H1, H2 that allows or blocks a pivoting movement of the door-lifting members H1, H2 around their pivots AS1 and AS2 under certain conditions. In other words, in order to raise the door 6 into the unlocked closed position and to lower the door 6 into the locked closed position, the blocking device allows a pivoting movement of the two door-lifting members H1, H2 around their pivots AS1 and AS2, thus permitting a movement of the first joint A1 and of the third joint A3 relative to the door 6. In contrast, in order to swing the raised door 6 open out of the unlocked closed position into the open position, and conversely, to swing it back from the open position into the raised unlocked closed position, the blocking device blocks the pivoting movement of the two door-lifting members H1, H2 in a predefined pivot position, as a result of which the first joint A1 and the third joint A3 are positioned so as to be stationary relative to the door 6.

It is fundamentally possible to also block the two door-lifting members H1, H2 in the lowered, locked closed position of the door 6 using the blocking device. As a result, the door 6 cannot be raised and thus unlocked either accidentally or, for instance, due to faulty functioning of an automatic raising drive that may have been provided.

Figure 2:
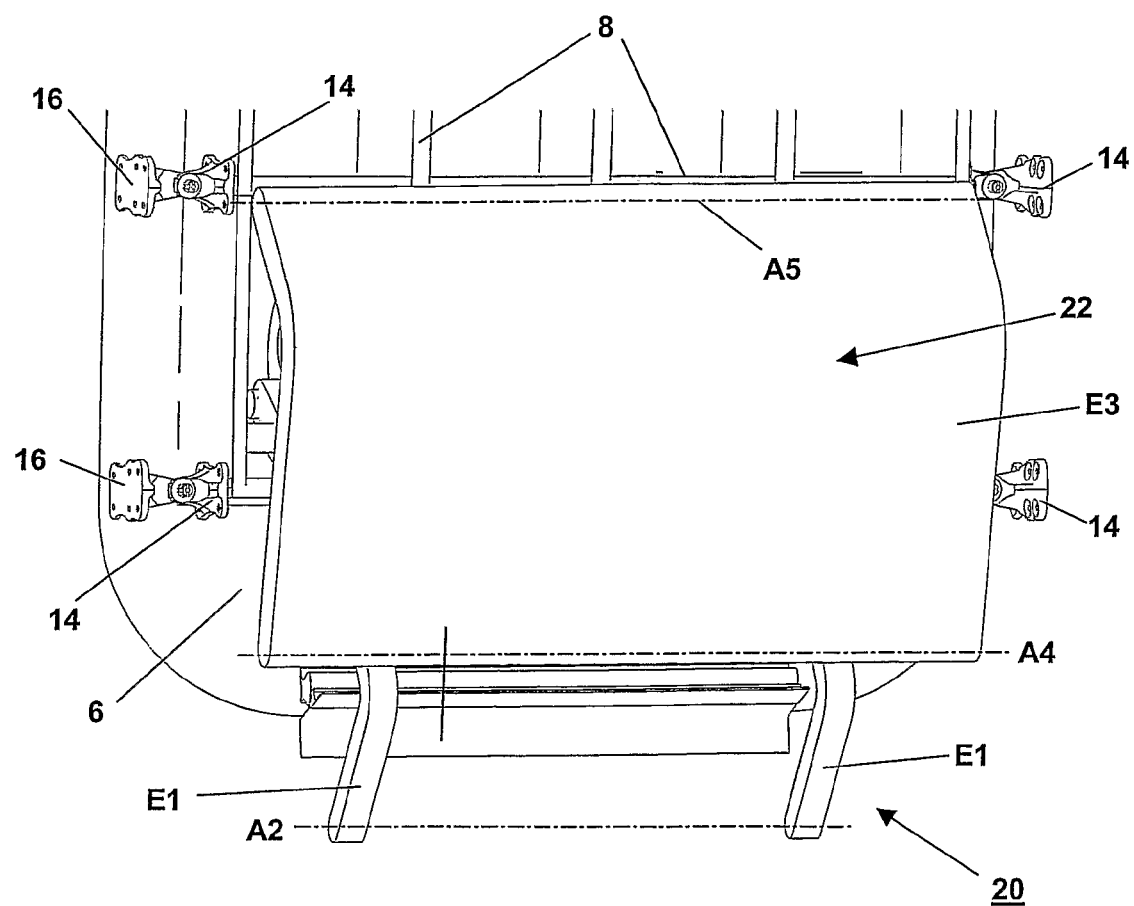
FIG. 2—a schematic perspective view of the door arrangement according to the invention as shown in FIG. 1, seen in the direction of arrow I in FIG. 1.

FIG. 2, which shows a schematic perspective view of the door arrangement according to the invention as depicted in FIG. 1, seen in the direction of arrow I in FIG. 1 (that is to say, in the viewing direction from the inside towards the outside of the aircraft fuselage), depicts other special features of the door arrangement according to the invention. For instance, the door arrangement is configured in such a way that, as the essential elements of the seven-joint linkage 20, it comprises two door joint mechanisms arranged essentially mirror-image on two side areas of the door 6 opposite from each other, said mechanisms each having a first linkage member E1 and a second linkage member E2 as well as a coupling element K (see FIG. 1). Both of the door joint mechanisms, however, only have a shared connecting third linkage member E3. The latter extends on the inside of the door 6 facing the interior of the fuselage 2 essentially along the entire width of the door from a left-hand side area to a right-hand side area of the door 6. Here, the third linkage member E3 is configured as a flat, plate-like element in the form of a step 22, as can be seen clearly in FIG. 2. This step 22 can either have a closed step surface or, for instance, with an eye towards reducing the weight, it can also be provided with cutouts and/or recesses or the like. Thus, the step 22 can also be constructed, for example, as a grid-like structural part. Like the other components of the door arrangement, the step 22 also has a lightweight construction.

In order to limit the swinging movement of the door 6 at each of its end positions, limit stops, stoppers or the like can be provided. Moreover, acceleration, deceleration and damping elements by means of which the movement of the door 6 towards each of its end positions can be controlled and, if necessary, braked can be installed between suitable components of the door arrangement, especially between the individual elements of the seven-joint linkage 20 and/or of the door frame 4. For the sake of clarity, these parts have not been shown in the figures.

The door 6 or the seven-joint linkage 20 is configured for manual operation and/or operation by an actuator. If the door 6 or the seven-joint linkage 20 is driven by an actuator (for example, in the form of an autonomous emergency-opening drive that is either configured as a separate drive or else integrated into a regular door drive), said actuator can especially be attached to a linkage member of the seven-joint linkage 20. For instance, it is possible to employ a rotary actuator that is coupled to a control device and that is attached to the joint A2, thus driving the first linkage member E1 and consequently, owing to the coupling by means of the coupling element K, also driving the entire seven-joint linkage 20, thus actuating the door 6.

Now the operating principle of the door arrangement according to the invention will be described on the basis of the first state depicted in FIG. 1.

In FIGS. 1 and 2, the door 6 is in the closed position in a closed, lowered and locked state (corresponding to a state during flight or in a state ready for flight). The pivoting angle of the door 6 is 0°. The sealing flange 10 on the frame side and the door gasket 12 on the door side lie against each so as to create a seal. The fittings 14, 16 on the door side and on the frame side are engaged with each other. The door pivot A1 is in a first position P1—predefined by the seven-joint linkage—inside the fuselage structure or fuselage contour in the area of the door frame 4. The two door-lifting members H1, H2 are blocked by the blocking device in the position shown in FIG. 1.

In order to unlock and raise the door 6, the two door-lifting members H1, H2 are released by means of the blocking device and can thus be pivoted around their pivots AS1 and AS2. By means of the seven-joint linkage 20, the door 6 is then moved slightly outwards approximately parallel to the original fuselage contour or outer contour of the door shown in FIG. 1, a process in which it is raised somewhat for purposes of disengaging the fittings 14, 16 on the door side and on the frame side, so as to give the door 6 the necessary degree of freedom from these elements and from the door frame 4. The initially almost parallel movement of the door 6 towards the outside is brought about by the configuration of the four-joint assembly A2, A4, A6 and A7, as a result of which the joints A1 and A3 move outwards with approximately the same speed at the beginning of the pivoting movement.

Figure 3:
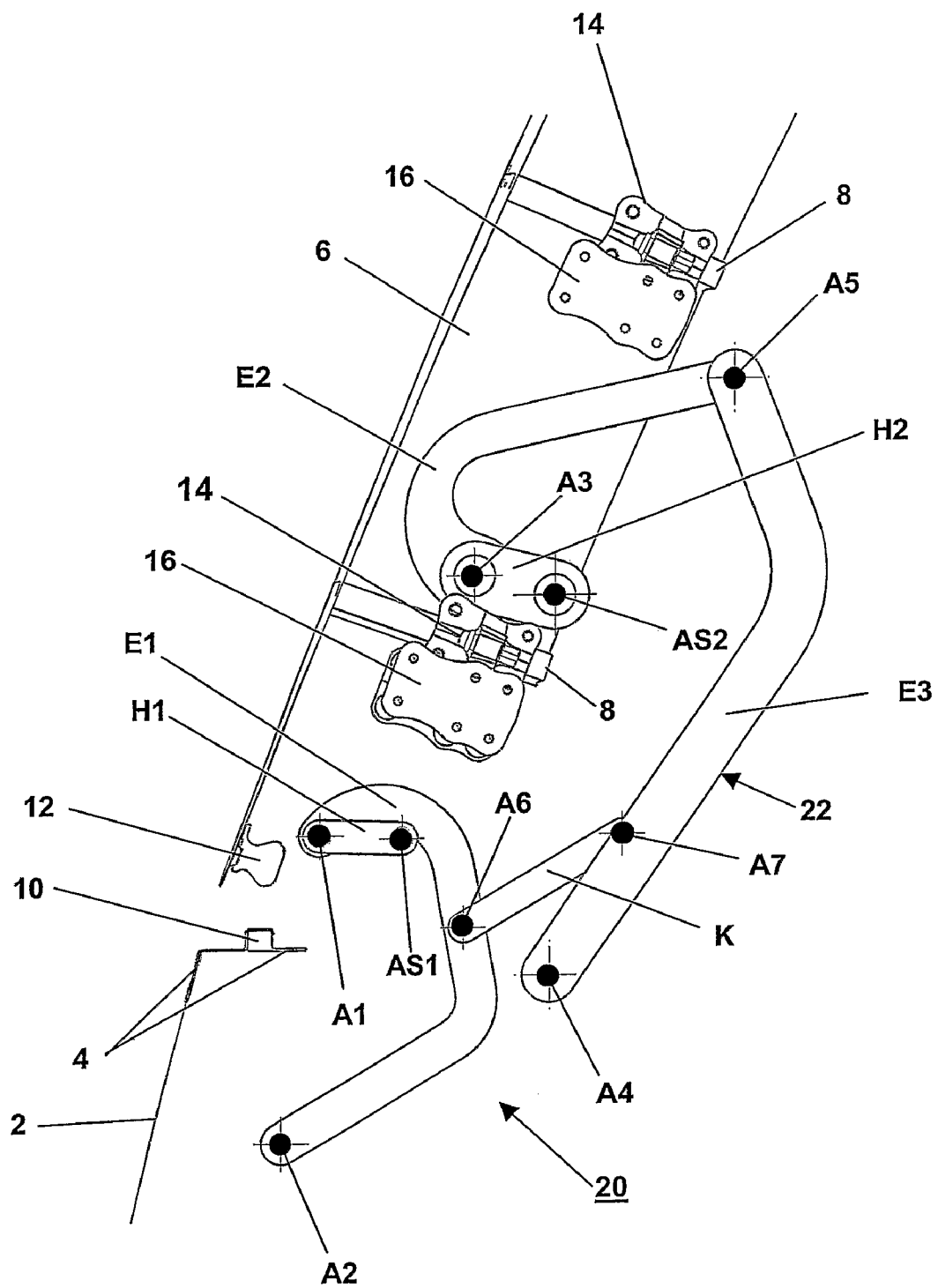
FIG. 3—a schematic cross-sectional view of the door arrangement according to the invention as shown in FIG. 1, in a second state.

FIG. 3 shows a schematic cross-sectional view of the door arrangement according to the invention, in a second state in which the door 6, starting from the state depicted in FIGS. 1 and 2, is in a raised and unlocked closed position. The pivoting angle of the door 6 is still approximately 0°. The sealing flange 10 on the frame side and the door gasket 12 on the door side, however, are already separated from each other due to the slight outward movement and raising of the door 6. Moreover, the fittings 14, 16 on the door side and on the frame side are disengaged. In the position depicted in FIG. 3, the blocking device now blocks any pivoting movement of the two door-lifting members H1, H2 around their pivots AS1 and AS2. As a result, the first joint A1, which forms the door pivot A1, and the third joint A3 are in a stationary position relative to the door 6. The door 6 is now ready to be opened and can be swung around the joint A1 laterally and downwards by about 180° into the open position. Since the joint/door pivot A1 is arranged on the movable second linkage member E1 of the seven-joint linkage 20, in this process, the joint A1 follows a path of motion—predefined by the seven-joint linkage 20—relative to the door frame 4 or its lower edge.

Figure 4:
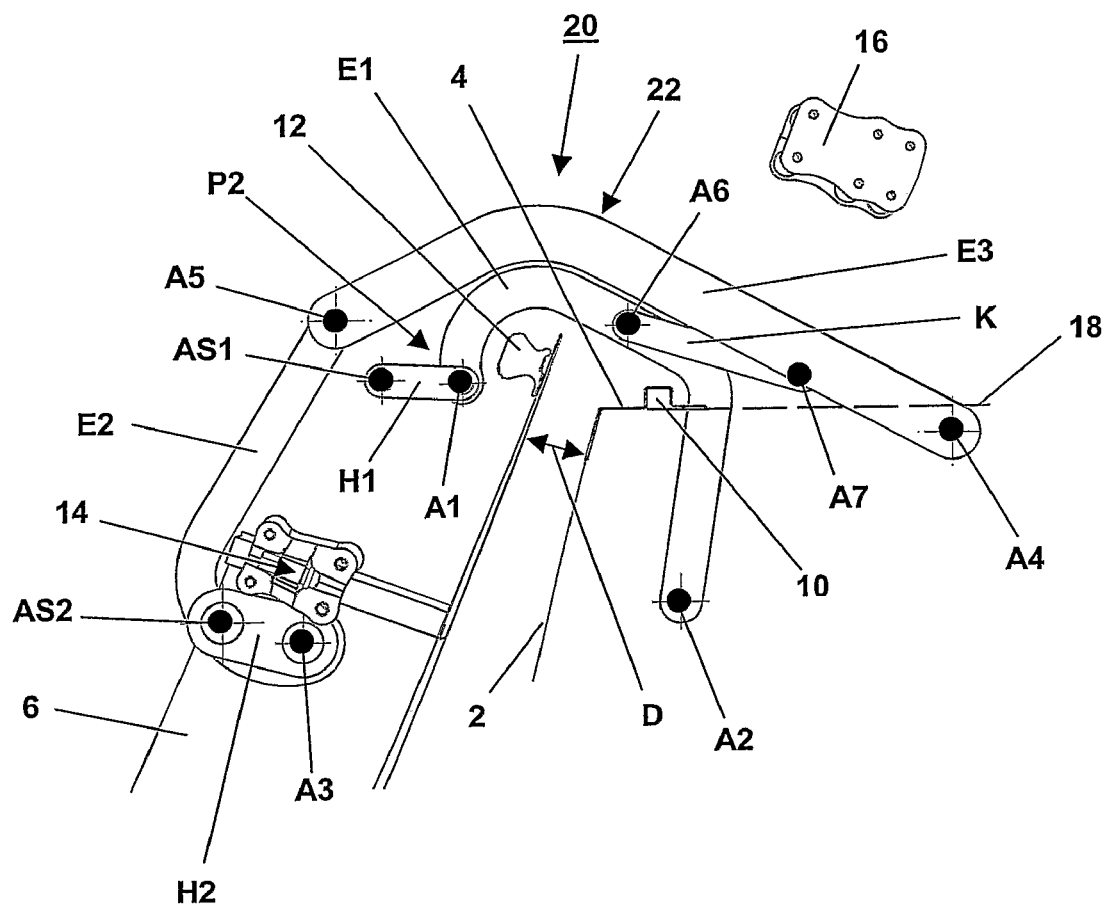
FIG. 4—a schematic cross-sectional view of the door arrangement according to the invention as shown in FIG. 1, in a third state.

FIG. 4 shows a schematic cross-sectional view of the door arrangement according to the invention as shown in FIG. 1, in a third state in which the door 6, starting from the state depicted in FIG. 3, is swung by a pivoting angle of 180° into the final open position. As can be clearly seen in FIG. 4, the joint/door pivot A1 is in a second position P2—predefined by the seven-joint linkage 20—outside of the fuselage structure or fuselage outer contour in the area of the door frame 4.

A comparison of FIG. 1 to FIG. 4 clearly shows that, during the movement of the door 6 guided by the seven-joint linkage 20 from the closed position into the open position (and vice versa), the joint/door pivot A1 follows a curved path of motion unambiguously defined by the seven-joint linkage 20, from the first position P1 to the second position P2 (and vice versa). This path of motion leads from the inside to the outside (and vice versa) around a lower edge of the door frame 4 and around its lower outer edge. As a result, a collision between the door edge (here, the door lower edge) and the fuselage 2 or the door frame 4 is avoided over the entire pivoting angle range. The position of the joint/door pivot A1 in the final open position, taking into consideration the thickness of the door, determines the lateral distance D between the swung open door 6 and the fuselage 2.

It can also be seen in FIG. 4 that the first linkage member E1 in the final open position extends with its hook-shaped end area beyond the lower edge of the door frame 4. The third linkage member E3, in turn, extends beyond the first linkage member E1 and runs slightly above the first linkage member E1 and forms the above-mentioned step 22 when the door 6 is in the open state. This step 22 extends beyond the lower edge of the door frame 4 and makes it easier for passengers to leave the fuselage 2 in case of an emergency. The curved segment of the third linkage member E3 in this position is approximately in the area of the hook-shaped end of the first linkage member E1. The coupling element K extends at an acute angle between the first and the third linkage members E1, E3. The second linkage member E2 connected to the third linkage member E3 is now located outside of the fuselage 2 or outside of the door frame 4. The hook-shaped end of the second linkage member E2 is located in the vicinity of the lower fitting 14 on the door side.

Starting from the open position depicted in FIG. 4, the door 6 is closed and locked in an analogous manner in the reverse order.

It can be seen that, when it comes to the above-mentioned operating principle of the door arrangement according to the invention, the length of the appertaining linkage members E1 to E3 and of the coupling element K, the appertaining arrangement and kinematic coupling of these components, the distances between the pivots A1 to A7 and pivots AS1, AS2 from each other as well as the installation of the seven-joint linkage 20 are all coordinated with each other with respect to the door 6, to the door thickness and to the door frame 4 in such a way that the door 6 can be reliably locked, raised, unlocked, opened and closed once again and so that a collision of the door 6 with the door frame 4 and the fuselage 2 as well as with any other add-on elements is avoided at all times during a swinging procedure and so that a requisite minimum distance from the outside of the fuselage 2 is achieved when the door 6 is completely opened or swung open.

The invention is not restricted to the embodiment above, which serves merely to elucidate the fundamental idea of the invention. Within the framework of the protective scope, the door arrangement according to the invention can also exhibit embodiments that differ from the one concretely described. Thus, for instance, it is possible to design the door with other configurations according to the invention, also in the form of a door that swings upwards or laterally. It is likewise conceivable to retain the inventive principle of the above-mentioned seven-joint linkage, but to perform a kinematic reversal in which those elements and pivots that were associated with the door frame or fuselage structure are now associated with the door while those that were associated with the door are now associated with the door frame or fuselage structure.

In other embodiments, particularly as a function of the installation situation of the door in the fuselage or door frame as well as of the thickness and the design of the door and of its door structure and of the desired maximum pivoting angle of the door, the lever-like linkage members E1 to E3 as well as the coupling element K can also be shaped differently, so that they can be, for example, rectilinear or else curved or angled multiple times.

In certain application cases, the at least one coupling element can also be configured, for instance, as a parallelogram with two coupling element arms. As a matter of principle, several coupling elements are also possible, provided that they still impart the seven-joint linkage with one degree of freedom. Likewise, embodiments can be realized in which the joints A6 and A7 associated with the coupling element are arranged on lateral projections of the first and third linkage members.

Instead of the pivoting lever-like door-lifting members employed in the above-mentioned example, which only have purely rotational joints, door-lifting members that are configured differently and that fulfill essentially the same functions can also be provided. Thus, for instance, door-lifting members are conceivable which have kinematics that are partially or completely translational and that position the joints A1 and A3 in a stationary position relative to the door when the door is swung. If the door is configured as a door that does not have to be lowered and raised in order to be locked and unlocked, then the door-lifting members H1 and H2 and an associated lifting device can be dispensed with. The joints A1 and A3 can then be arranged directly on the door so that they are stationary relative to the latter.

Instead of configuring the third linkage member E3 itself as a step, it is also possible to install an additional linkage onto the linkage member E3 or onto a corresponding pair of linkage members to carry the step. This embodiment can be useful, for example, in order to employ the additional linkage to attain an exact horizontal positioning of the step when the door is in the open state.

In certain application cases, at least one linkage member of the seven-joint linkage or else the coupling element can be configured such that their length can be varied. For example, such a length-variable element can be configured in the form of a linear actuator. The length-variable element then assumes a dual function with which certain kinematics of the linkage as well as the actuation of the seven-joint linkage and/or of the door are achieved.

The reference numerals in the claims, in the description and in the drawings serve merely to better elucidate the invention and should not be construed as a limitation of the protective scope.

The invention claimed is:

1. A door arrangement for an aircraft that has a fuselage with a fuselage structure that includes a door frame surrounding a door opening, the door arrangement comprising:
   a door to be disposed inside the door frame; and
   a first door joint mechanism attached to the door and to the fuselage structure, and including a seven-joint linkage with first to seventh joints, the door being moveable exclusively in a rotationally articulated manner by the linkage over a predefined pivoting angle range from a closed position inside the door frame to an open position outside of the door frame and fuselage, and back again;
   wherein the seven-joint linkage has three articulated lever-like linkage members and at least one articulated, lever-like coupling element joining two of the three lever-like linkage members to each other in an articulated manner, the lever-like coupling element imparting the seven-joint linkage with one degree of freedom;
   wherein, in the closed position of the door and viewing the seven-joint linkage in the direction of the joints:
   the first linkage member is mounted at its upper end with the first joint in an articulated manner on the door, wherein the first joint can be locked in a stationary position relative to the door and forming a pivot with the door, and the first linkage member is mounted at its lower end with the second joint in an articulated manner on the door frame, the second joint being disposed stationary relative to the door frame;
   the second linkage member is mounted at its lower end with the third joint in an articulated manner on the door, wherein the third joint can be locked in a stationary position relative to the door;
   the third linkage member is mounted at its lower end with the fourth joint in an articulated manner on the door frame, the fourth joint being disposed stationary relative to the door frame;
   an upper free end of the second linkage member is connected to an upper free end of the third linkage member via the fifth joint, the fifth joint being non-stationary relative to the door and the door frame, so that the upper ends of the second linkage member and of the third linkage member have the fifth joint as a shared joint, and the second linkage member is pivotable around the third joint and the third linkage member is pivotable around the fourth joint; and at its lower end, the articulated lever-like coupling element with the sixth joint is attached in an articulated manner to the first linkage member and, at its upper end, the articulated lever-like coupling element with the seventh joint is attached to the third linkage member.

2. The door arrangement as recited in claim 1, wherein the first joint defines an unambiguous door pivot that is rotatory and that can be positioned stationary relative to the door; and wherein, in the closed position of the door, the first joint is in a predefined first position inside the fuselage structure in the area of the door frame, and in the open position of the door, the first joint is in a predefined second position outside of the fuselage structure in the area of the door frame, and during a movement of the door from the closed position into the open position and vice versa, the first joint follows a curved path of motion unambiguously defined by the seven-joint linkage, from the first position to the second position and vice versa.

3. The door arrangement as recited in claim 1, wherein joints of the seven-joint linkage are disposed parallel to each other.

4. The door arrangement as recited in claim 1, further comprising a door locking mechanism and a lifting device configured to raise the door from a locked closed position into the closed position and to lowered from the closed position into the locked closed position.

5. The door arrangement as recited in claim 4, wherein the lifting device is configured as a part of the seven-joint linkage.

6. The door arrangement as recited in claim 5, wherein:
the lifting device has two pivoting lever-like door-lifting members,
one end of the first door-lifting member is attached in an articulated manner to the upper end of the first linkage member via the first joint and the other end of the first door-lifting member is attached to the door via a first door lifting pivot that is stationary relative to the door,
one end of the second door-lifting member is attached in an articulated manner to the lower end of the second linkage member via the third joint and the other end of the second door-lifting member is attached to the door via a second door lifting pivot that is stationary relative to the door, and
a blocking device is provided that is associated with the first and second door-lifting members that allows a pivoting movement of the first and second door-lifting members around their respective pivots in order to raise the door into the closed position and to lower the door into the locked closed position and to permit a movement of the first joint and of the third joint relative to the door, the blocking device blocks a pivoting movement of the first and second door-lifting members in a predefined pivot position, thus positioning the first joint and the third joint so as to be stationary relative to the door and to swing the raised door open out of the closed position into the open position and to swing the door back from the open position into the closed position.

7. The door arrangement as recited in claim 1, further comprising a further door joint mechanism arranged essentially mirror-image on a second side area of the door opposite from the first door joint mechanism, said further mechanism having a further first linkage member, a further second linkage member and a further shared third linkage member.

8. The door arrangement as recited in claim 1, wherein the shared third linkage member is configured as a flat, plate-like element.

9. The door arrangement as recited in claim 1, wherein the shared third linkage member forms a step when the door is in the open position.

10. The door arrangement as recited in claim 1, wherein the pivoting angle range goes from 0° to 180°.

11. The door arrangement as recited in claim 1, wherein the door joint mechanism is attached to a lower area of the door frame of the fuselage structure and can be swung from the closed position downwards into the open position and back.

12. The door arrangement as recited in claim 1, wherein the door joint mechanism is attached to an upper area of the door frame of the fuselage structure and can be swung from the closed position upwards into the open position and back.

13. The door arrangement as recited in claim 1, wherein the door joint mechanism is attached to a lateral area of the door frame of the fuselage structure and can be swung from the closed position laterally into the open position and back.

14. The door arrangement as recited in claim 1, wherein the door is selected from a group of doors consisting of an emergency-exit door, an emergency-exit hatch, a passenger door, a cargo door and a hatchback.

15. An aircraft having a fuselage with a fuselage structure comprising at least one aircraft door arrangement according to claim 1.

\* \* \* \* \*